April 17, 1951     C. S. ASH     2,548,928
VEHICLE WHEEL

Filed Nov. 9, 1945     3 Sheets-Sheet 1

INVENTOR
Charles S. Ash
BY
ATTORNEY

April 17, 1951  C. S. ASH  2,548,928
VEHICLE WHEEL

Filed Nov. 9, 1945  3 Sheets-Sheet 2

INVENTOR
Charles S. Ash
BY
ATTORNEY

April 17, 1951   C. S. ASH   2,548,928
VEHICLE WHEEL
Filed Nov. 9, 1945   3 Sheets-Sheet 3
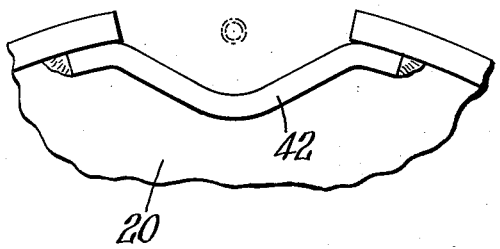
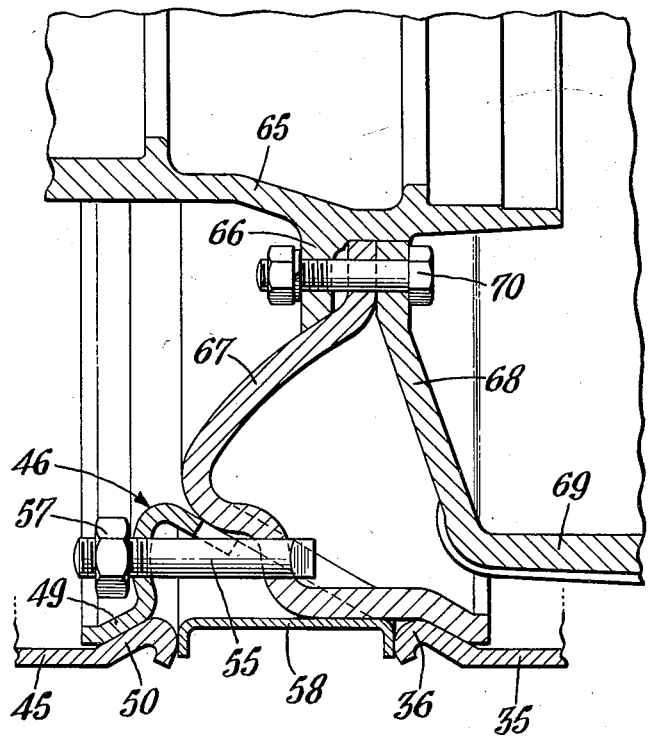
INVENTOR
Charles S. Ash
BY
ATTORNEY

UNITED STATES PATENT OFFICE 2,548,928

VEHICLE WHEEL

Charles S. Ash, Milford, Mich.

Application November 9, 1945, Serial No. 627,636

2 Claims. (Cl. 301—13)

The present invention relates to vehicle wheels and more particularly to vehicle wheels adapted to demountably support a plurality of road engaging elements.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 4 is a fragmentary side view of a portion of the vehicle wheel web shown in the first three drawings showing a detail of the construction thereof; and Fig. 5 is a fragmentary cross-sectional view of a modified embodiment of the vehicle wheel of the present invention.

It is an object of the present invention to provide an improved vehicle wheel of the type adapted to demountably support a pair of road engaging elements such as, for instance, pneumatic tires. The invention provides a vehicle wheel of relatively simple and extremely sturdy construction formed with a single web element with means for demountably mounting a pair of tire rims on the element. Still another object of the invention is the provision of a vehicle wheel which is economical to fabricate both in labor and materials. In particular, a vehicle wheel of a minimum of assembled parts is provided with substantially less welding incorporated in the construction than is required in other wheels of comparable design and use. A further object of the invention is the provision of a vehicle wheel to demountably support a pair of tire rims having simpler mounting means for said rims and improved driving connection between the rims and other portions of the wheel. The invention further provides a vehicle wheel construction which allows great latitude in the choice of materials from which the various parts of the wheel assembly are to be made.

Figure 1:
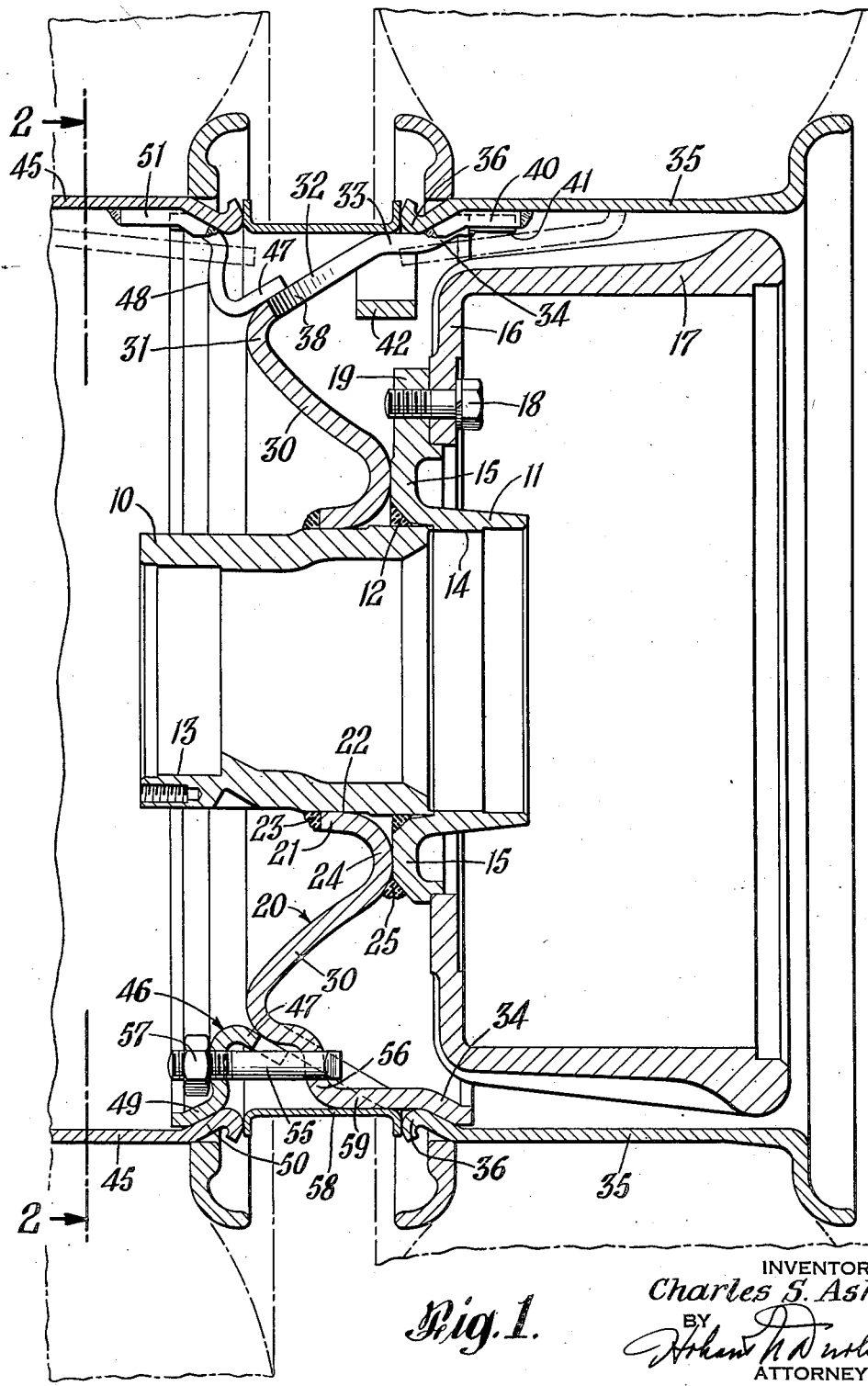
Fig. 1 is a cross-sectional view taken along line 1—1 of Fig. 2 showing a typical and illustrative embodiment of the present invention.
Figure 2:
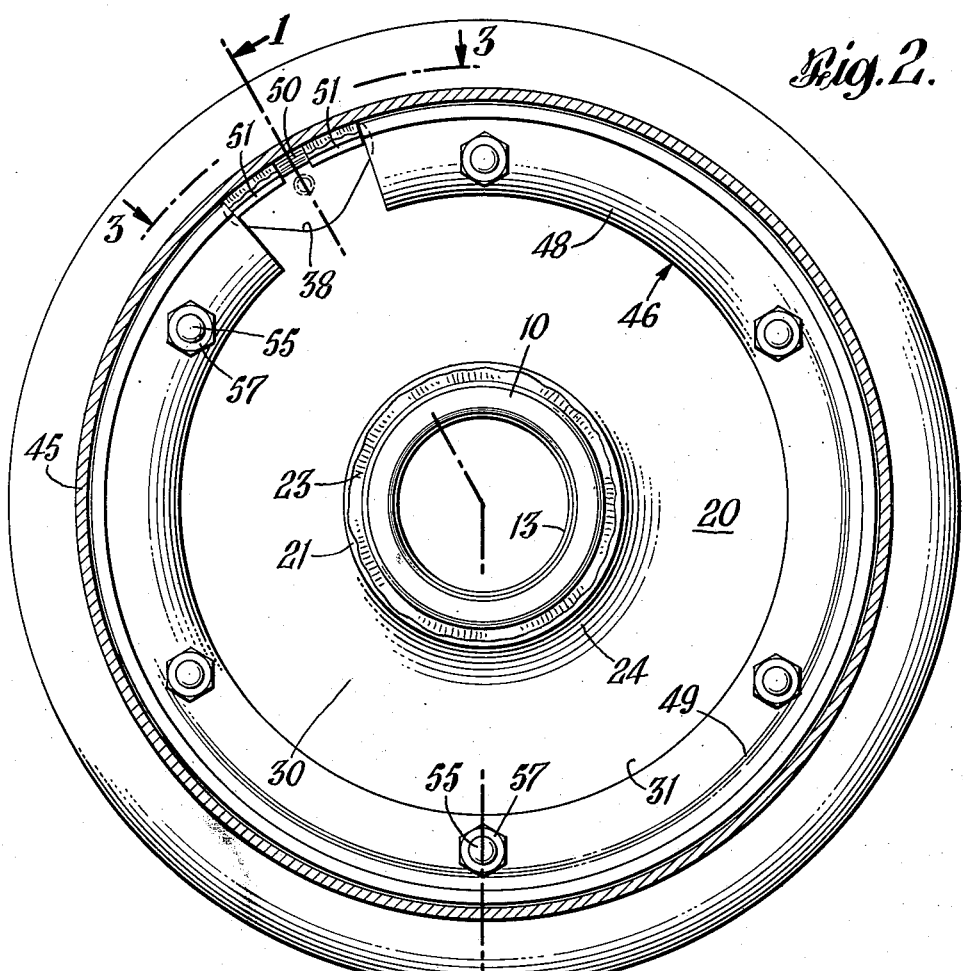
Fig. 2 is a sectional view of the wheel shown in Fig. 1 viewed from the outboard side of the assembly taken along line 2—2 of Fig. 1.

Referring now in detail to the illustrative embodiments of the invention shown by way of example in the accompanying drawings, and referring first to the embodiment of Figs. 1 to 4 inclusive, there is provided in the vehicle wheel an elongated tubular hub member formed of an outer cylindrical portion 10 and a somewhat shorter inner cylindrical portion 11. The hub portion 11 is formed at one end with a frustoconical mouth to its central bore, as shown in Fig. 1, and an end of hub portion 10 is adapted to be positioned therein and securely welded to hub portion 11 by means of a circular line of welding 12. Hub portion 10 is internally finished at 13 and portion 11 at 14 for the reception of anti-friction bearings whereby the hub may be mounted for free rotation upon a vehicle axle end.

Hub portion 11 has an integrally formed outwardly radially extending flange 15 which is finished with a seat to receive the inner periphery of a brake drum head or flange 16 of a conventional type brake drum 17. The drum 17 is removably secured to the wheel hub 10—11 for correlative rotation therewith by means of tap bolts 18 which extend through brake drum flange 16 and into a plurality of peripheral, spaced, integral lugs 19 of hub flange 15.

The dual rim supporting means of the wheel comprise a single radially extending wheel web 20 which may conveniently be pressed into a strong reversely curved configuration and thereafter assembled on the wheel hub 10—11. As best shown in Fig. 1 of the drawings, the web 20 is formed with a short cylindrical portion 21 at its inner periphery which is received on a seat 22 on hub portion 10 substantially centrally of the length of the composite hub 10—11. A circular line of welding 23 at the end of cylindrical portion 21 securely joins the hub and web.

Immediately radially outwardly of cylindrical portion 21 the web 20 is reversely turned at portion 24 and abuts the hub flange 15 to provide a strong, mutually reinforcing hub and web structure. A plurality of spot welds 25 between the web 20 and hub flange 15 may further strengthen the assembled wheel.

Figure 3:
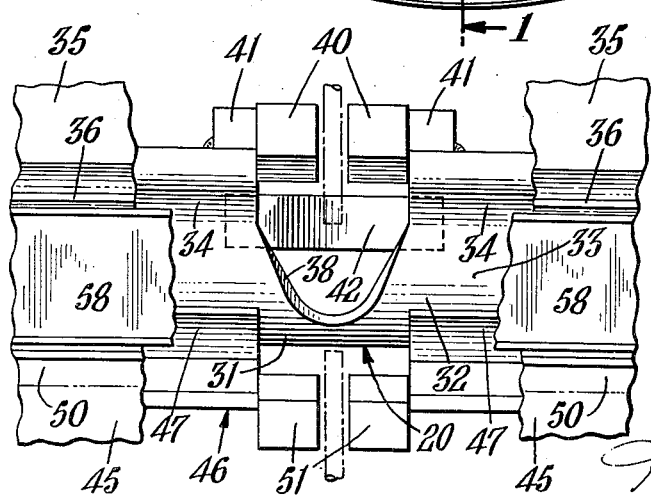
Fig. 3 is a view of the wheel assembly taken along line 3—3 of Fig. 2, with certain parts broken away for greater clarity.

Radially outwardly beyond the turned web portion 24 the web extends in an outwardly dished central portion 30, and is thereafter abruptly reversely turned at 31 into an inwardly dished portion 32. Portion 32 terminates in a short cylindrical web portion 33 having an inclined inner edge 34 whereby the inner tire rim 35 may be removably mounted on the web with its edge bead 36 seated against portion 34. As shown in Figs. 1 and 3 of the drawings, the web 20 is slotted at 38 throughout portions 32, 33 and 34 providing an aperture through the web at its outer periphery which may accommodate a valve stem for the inner tire on rim 35. The slotted portion 38 of the wheel web further presents internal edges of web cylindrical portion 33 against which are seated driving plates 40 on the inner surface of rim 35. A pair of extensions 41, as clearly shown in Fig. 3 may be welded to the axially inner edge of web 20 adjacent slotted portion 38 presenting edges which likewise abut driving plates 40 of rim 35. There is thus provided a positive driving engagement between the inner tire rim and wheel web, and a curved tie plate 42 (Fig. 4) may be secured to the web and extend across slotted portion 38 to prevent any spreading or bending of the web.

The means for supporting and removably securing an outer tire rim 45 in the wheel assembly comprises a strongly formed split ring 46 of reversely curved cross section which may be mounted on the single wheel web 20. As best shown in Fig. 1 of the drawings split ring 46 is formed with an inclined inner edge portion 47 which is adapted to seat on the lower extent of dished portion 32 of the web. The ring 46 is further formed with a radially extending central portion 48 terminating radially outwardly in an inclined portion 49 which is adapted to engage and support and hold the outer rim 45 at its inclined edge bead 50. The outer rim 45 is preferably a duplicate of the inner rim 35 and is oppositely disposed in the assembled wheel. The driving plates 51 of the rim 45 are adapted to be received in the interrupted portion of the circumference of split ring 46 and a positive driving connection is thus effected between the edges of the ring and the driving plates secured to the rim 45. The interrupted portion of ring 46 also is positioned to correspond with slotted portion 38 of web 20 so that access may be had to the inner tire valve stem.

The means for demountably securing split ring 46 to web 20 include a plurality of bolts 55 spaced apart circumferentially of the wheel and extending through apertures in web 20 and split ring 46. As shown, web 20 at the places where bolts 55 are located is formed in its dished portion 32 in flattened plane portions 56 in which the apertures for bolts 55 are provided. The bolts are flattened at one end and provided with cooperating nuts 57 to removably hold ring 46 to web 20. Spacer ring 58 is positioned between the rims contacting beads 36 and 50, and is seated on cylindrical portion 33 of web 20, and small extensions thereof 59 at the bolt locations.

There is thus provided a single web vehicle wheel having simple mounting means for a pair of tire rims, and it may be noted that there is a positive driving connection between each of the rims and adjacent portions of the wheel. It may further be noted that lugs and lug seats are not required in the demountable rim assembly, and that welded parts in the wheel are reduced to a minimum.

In the embodiment of the invention shown in Fig. 5 of the drawings a further reduction is made in welding in the wheel assembly. As there shown, a one piece tubular hub 65 is provided with an integral flange 66 having an inclined peripheral seat to receive an inclined portion of wheel web 67. Web 67 and the head or flange 68 of a brake drum 69 are secured to hub flange 66 by bolts 70 at the axially inner side of the hub flange. The means for mounting a pair of tire rims on web 67 are identical to those already discussed in connection with the first embodiment of the invention, as clearly shown in Fig. 5, and are therefore not further enumerated.

The invention herein shown and described will be found particularly important and useful where it may be desired to fabricate a wheel of aluminum alloy or similar material, or of such an alloy and steel, such as in the hub, for instance, because welding has been reduced to a minimum.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel assembly comprising, in combination, a web member having a substantially S configuration in radial cross section, a ring member of substantially S configuration in radial cross section having a turned portion at its inner periphery providing an inclined surface seating on an inclined surface of a radially outer reach of said web member, said ring member extending substantially radially outwardly from said turned portion and having an axially outwardly inclined portion at its outer periphery, said web member having a cylindrical portion and an axially inwardly inclined portion at its outer periphery, a pair of rims each having an inclined surface at its inner periphery seated on a respective one of said inclined outer peripheral portions of said members, a spacing ring between said rims seated on said cylindrical portion, and means removably securing said first ring member to said web.

2. A vehicle wheel assembly comprising, in combination, a pressed web member having a substantially S configuration in radial cross section with an interrupted portion at its periphery, a completely interrupted ring member having a turned portion at its inner periphery providing an inclined surface seating on an inclined surface of a radially outer reach of said web member, said ring member extending substantially radially outwardly from said turned portion and having an axially outwardly inclined portion at its outer periphery, said web member having a cylindrical portion and an axially inwardly inclined portion at its outer periphery, a pair of rims each having an inclined surface at its inner periphery seated on a respective one of said inclined outer peripheral portions of said members, said rims having lug portions to be respectively received in said web member interrupted portion and the interrupted place of said ring member, a spacing ring between said rims seated on said cylindrical portion, and means removably securing said first ring member to said web.

CHARLES S. ASH.

REFERENCES CITED

The following references are of record in the file of this patent:

UNITED STATES PATENTS

| Number | Name | Date |
|---|---|---|
| 1,327,607 | Baker | Jan. 13, 1920 |
| 1,640,063 | Williams | Aug. 23, 1927 |
| 1,679,892 | Bretaud | Aug. 7, 1928 |
| 1,761,284 | Williams | June 3, 1930 |
| 1,828,500 | Kay | Oct. 20, 1931 |
| 1,857,747 | Vanderveer | May 10, 1932 |
| 1,878,213 | Walther | Sept. 20, 1932 |
| 1,953,321 | Walther | Apr. 3, 1934 |

FOREIGN PATENTS

| Number | Country | Date |
|---|---|---|
| 297,767 | Great Britain | May 9, 1929 |
| 728,894 | France | July 12, 1932 |